United States Patent [19]

Hayashi

[11] Patent Number: 4,848,495
[45] Date of Patent: Jul. 18, 1989

[54] HYDRAULIC DAMPER

[75] Inventor: Junichi Hayashi, Akashi, Japan

[73] Assignee: Yamato Scale Company, Limited of Akashi, Japan, Akashi, Japan

[21] Appl. No.: 246,348

[22] Filed: Sep. 19, 1988

[30] Foreign Application Priority Data

Sep. 19, 1987 [JP] Japan .................. 62-143388

[51] Int. Cl.$^4$ ............................ G01G 23/08
[52] U.S. Cl. .................................. 177/187
[58] Field of Search .............. 177/184, 187-189

[56] References Cited

U.S. PATENT DOCUMENTS 4,084,652  4/1978  Sharp-Dent et al. ............ 177/189 X

FOREIGN PATENT DOCUMENTS 1030870  5/1966  United Kingdom ................ 177/184

Primary Examiner—George H. Miller, Jr.
Attorney, Agent, or Firm—Senniger, Powers, Leavitt & Roedel

[57] ABSTRACT

A hydraulic damper for an apparatus for measuring weight or force. The apparatus includes a base frame and an elastic load cell attached to the base frame, the elastic load cell having a movable part which vibrates relative to the base frame. The damper comprises pair of spaced support members fixed ot each other and to one of the base frame and movable part, a partition member fixed to the other of the base frame and movable part and positioned between the support members, a pair of flexible wall members extending between the partition member and the support members to form a pair of sealed chambers on opposite sides of the partition member, a narrow passage interconnecting the chambers, and liquid contained in the chambers whereby movement of the movable part of the load cell effects relative movement between the partition member and the support members to force liquid to flow between the chambers via the narrow passage thereby to damp the movement of the movable part of the load cell.

10 Claims, 4 Drawing Sheets

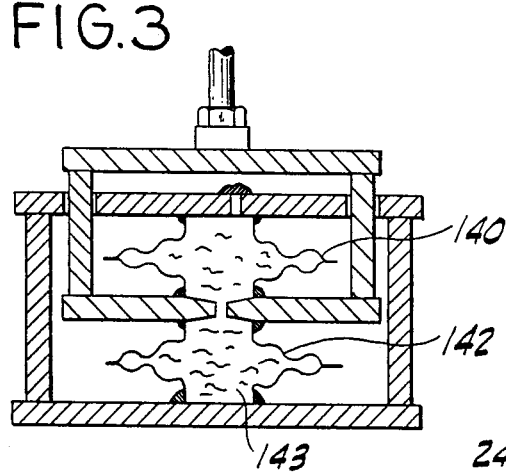
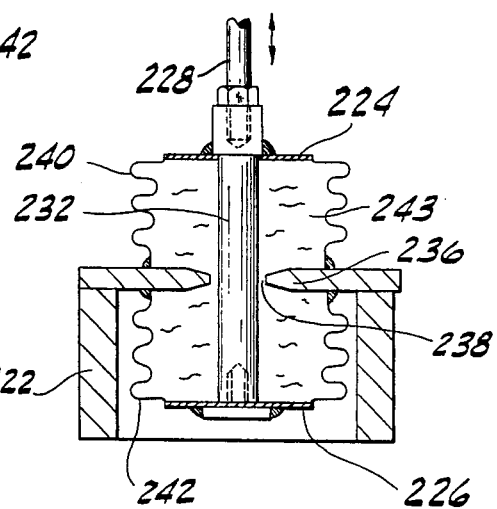
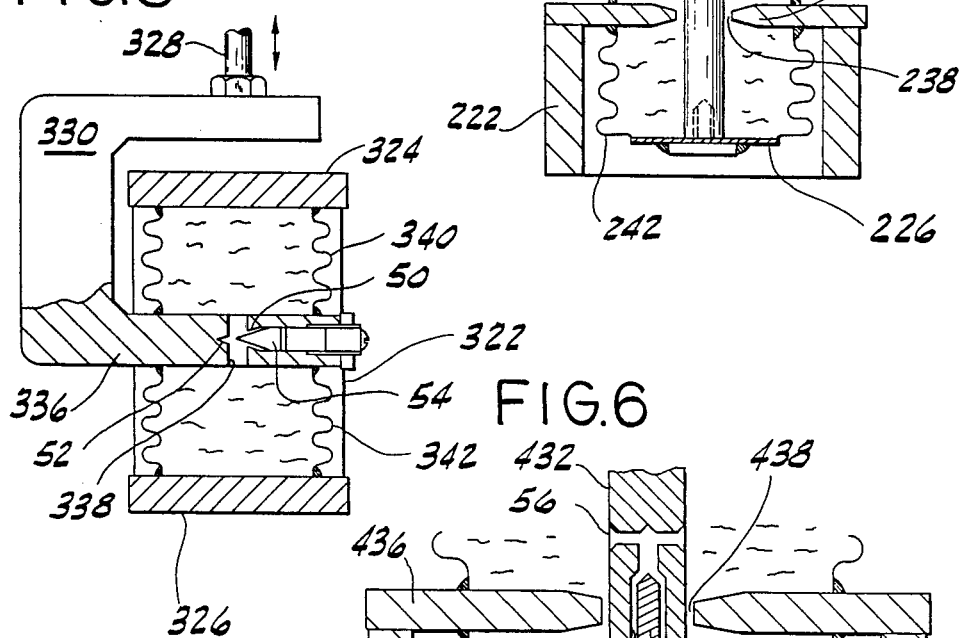
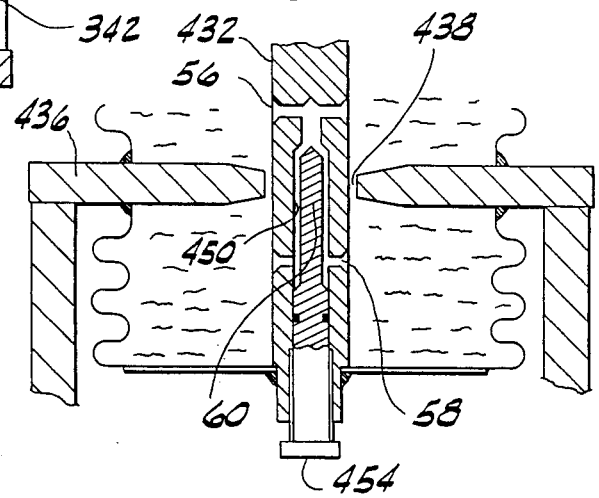

HYDRAULIC DAMPER

FIELD AND BACKGROUND OF THE INVENTION

This invention relates to a damper, particularly a hydraulic damper used with a weighing apparatus to damp the vibration which occurs as a result of an article being loaded onto the loading tray of the apparatus.

For today's weighing apparatuses, in addition to the demand for improvements in automation and in weighing precision, there is also a considerable demand for the weighing operations to be performed at a higher speed.

However, when an article is loaded onto the loading tray of the weighing apparatus, the impact force of the loading causes the free or movable end of the elastic member which supports the tray to vibrate substantially vertically. The vibration continues until the mechanical friction of the apparatus, the air resistance of the movable part which accompanies the vibration, etc., have caused a loss of energy and a natural damping of the vibration. Thus, if the calculation of the weight is delayed until the natural damping occurs, the weighing operation will take a long time and it will be impossible to achieve the desired high-speed weight measurement.

For this reason, in order to increase the speed of the weighing process, it is common to forcedly damp the vibration by providing a suitable type of damper between the elastic member and the frame of the apparatus. Magnetic dampers are rather expensive relative to their damping performance or effect, and they are seldom used. Pneumatic dampers are also seldom used, because the low flow resistance of the gaseous medium used in the dampers provides only a slight damping effect. Thus, the most general type of damper used on weighing apparatuses is the hydraulic type.

FIG. 10 of the accompanying drawings shows a conventional weighing apparatus having a hydraulic damper. The apparatus includes a frame F, an elastic load cell E in the form of a parallelogram fixed to the frame F, a loading tray L supported on the free end E1 of load cell E, and a piston plate P connected to the end E1 via a rod R. Also fixed to the frame F is a dashpot D containing water, oil, mercury, or some other fluid in accordance with the desired damping characteristics. The piston P is immersed in the liquid with a narrow gap G formed between the piston and the peripheral wall of dashpot D.

During the weighing process, the piston P vibrates with free end E1 of the load cell. This moves the fluid inside the dashpot D against resistance through the gap G, and the resistance effectively diminishes the amplitude of vibration.

Especially with an oil damper, the high viscosity of the oil provides a large resistance when the oil passes through the gap G, thus achieving a much larger damping effect or force than could be obtained from a pneumatic damper. By selecting an appropriate viscosity for the oil or other fluid and an appropriate size for the gap through which the fluid passes, it is possible to obtain a wide range of damping effect, and thus this type of damper features ideal performance with the optimum transition response characteristics for enabling a weighing apparatus to change from a freely vibrating state to a generally steady state generally in one to two cycles.

However, because the top of dashpot D is open, whenever the apparatus is moved, the fluid must be removed from the dashpot in order to prevent it from being spilled, thus making it very inconvenient to move the apparatus. Another problem is that dust, etc. can fall into the open dashpot D from above and become lodged in the gap G, thus causing the damping characteristics to become unstable. Also, a different type of fluid or other foreign matter can become mixed into the dashpot, changing the viscosity, etc. of the fluid and also changing the fluid level and the buoyancy, which will be discussed later, thus changing the damping characteristics.

Furthermore, because the depth to which the connecting rod R descends into the fluid changes in accordance with the weight of the articles, thus changing the volume of rod R in the fluid, the buoyancy of the rod, i.e., the upward force exerted on the free end E1 of the elastic member, changes, thus making it impossible to obtain precise measurements on weighing apparatuses which are used to measure small loads.

In addition, the surface tension of the fluid on the rod R and the peripheral wall of dashpot D also exerts an upward or downward force on the free end E1 of the load cell in the same way as the buoyancy just mentioned. Because minute changes in these forces occur as a result of the changes in surface area in contact with the fluid caused by the movement of the rod R, there is an undesirable or adverse effect on weighing precision, particularly where small loads are being weighed.

SUMMARY OF THE INVENTION

The object of this invention is to provide a hydraulic damper free of the above mentioned problems.

Briefly, this invention involves a hydraulic damper for an apparatus for measuring weight or force, the apparatus including a base frame and elastic means. The elastic means has a part which is adapted to vibrate relative to the frame. The damper comprises a pair of spaced support means fixed to each other and to one of the frame and the movable part, partition means fixed to the other of the frame and the movable part and positioned between the support means, a pair of flexible wall means each extending between the partition means and one of the support means to form a pair of sealed chambers on opposite sides of the partition means, narrow passage means interconnecting the chambers, and liquid contained in the chambers whereby movement of the movable part is adapted to effect relative movement between the partition means and the support means to force liquid to flow between the chambers via the narrow passage means thereby to damp the movement of the movable part.

Other objects and features will be in part apparent and in part pointed out hereinafter.

BRIEF EXPLANATION OF THE DRAWINGS

Preferred embodiments of the present invention will be described below with reference to the accompanying drawings, wherein:

FIGS. 3–9 are side cross-sectional views of various dampers according to the other embodiments;

Corresponding reference characters indicate corresponding parts throughout the several views of the drawings.

DETAILED DESCRIPTION OF THE PREFERRED EMBODIMENTS

Figure 1:
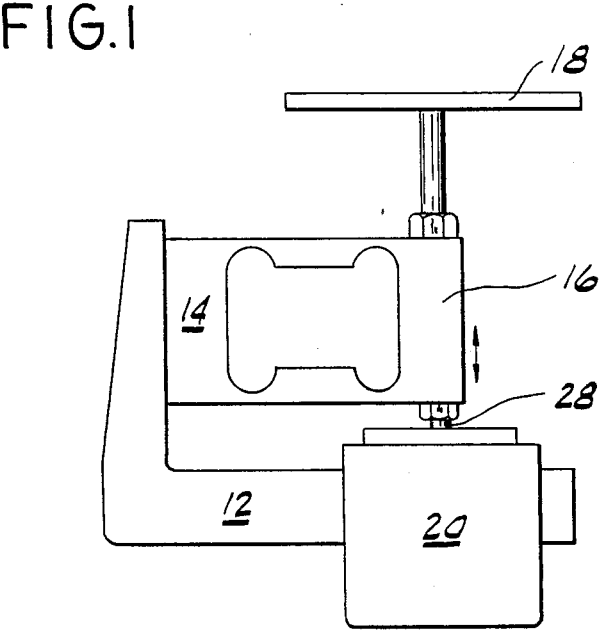
FIG. 1 is an overall side view of a weighing apparatus of the load cell type according to one of the embodiments of this invention.

With reference to FIG. 1, the weighing apparatus includes a base frame 12, to which an elastic load cell member 14 in the form of a parallelogram is fixed at one end. The free end or movable part 16 of load cell 14 supports a loading tray 18 on its upper side. Interposed between the movable part 16 and the frame 12 is a hydraulic damper 20.

Figure 2:
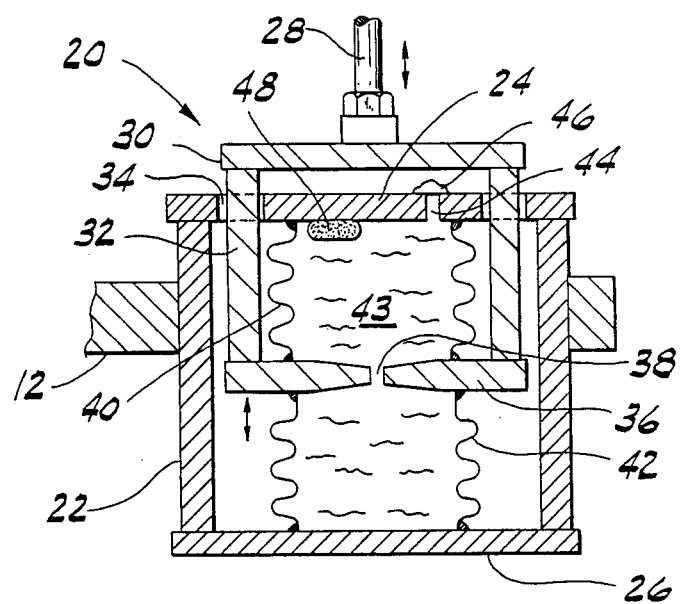
FIG. 2 is a side cross-sectional view of the damper included in the apparatus shown in FIG. 1.

As shown in FIG. 2, the damper 20 includes a rigid casing having a vertical cylindrical wall 22, which is fixed to the frame 12, and upper and lower horizontal walls 24 and 26 (constituting a pair of spaced support means) which are fixed to respective ends of the cylindrical wall.

Screwed into the lower side of free end 16 of the elastic load cell member is a vertical rod 28, the lower end of which is screwed into a disc 30. Legs 32 extend from the periphery of disc 30 loosely through holes 34 formed in the upper casing wall 24. Fixed to the lower ends of legs 32 is a horizontal partition plate 36 formed with a small opening 38 through its center. The screwed connection of the rod 28 allows the position of partition 36 to be adjusted relative to the load cell 14. The partition 36 is positioned generally centrally of the casing midway between the upper and lower casing walls 24 and 26.

An upper cylindrical bellows member 40 (constituting one flexible wall means) is attached at its upper end to the upper casing wall 24 and at its lower end to the partition 36, around the center opening 38 and radially inside the legs 32. Likewise, a lower cylindrical bellows member 42 (constituting another flexible wall means) of the same size as the upper bellows member is attached at its upper end to the partition 36 and at its lower end to the lower casing wall 26.

Thus, the bellows members 40 and 42, casing walls 24 and 26 and partition 36 form a sealed tank 43, which encloses upper and lower spaces or chambers over and under the partition, respectively. The upper casing wall 24 is formed with an opening 44 for filling the tank 43 with oil. The tank is filled substantially fully. The opening 44 is sealed with a cap 46 after filling the tank.

In operation, the vibration of free end 16 of the elastic load cell member is transmitted to the partition 36 of the damper. The partition 36 then moves vertically inside the tank 43, with the oil flowing through the center opening 38 in the partition in a direction opposite from the movement of the partition. During this movement, because the opening 38 has a small diameter, a large amount of flow resistance is created, which effectively damps the vertical movement of partition 36.

It will be observed that because there are no parts moving across the fluid surface inside the tank 43 during vibration, the buoyancy forces exerted on the movable part 16 always remains fixed. Moreover, because the tank 43 is approximately fully filled with fluid, the surface tension at the damper 20 also remains fixed.

As shown in FIG. 2, even if the tank 43 contains a slight amount of gas 48, because this will collect at the top, and because the amount is small, it will have substantially no effect on the buoyancy or surface tension mentioned earlier, and thus will have no adverse effect on the precision of the weighing apparatus.

Because the partition 36 is positioned axially in the center of tank 43, and because the effective cross-sectional areas of the upper and lower chambers of tank 43 are equal, the accuracy of the weighing apparatus will not be affected by changes in fluid and/or ambient temperatures. It will be noted in this regard that pressures in the structural members forming the tank 43 will be caused by strain resulting from the thermal expansion which accompanies a change in temperature. However, these pressures will offset each other, because they will be of equivalent magnitudes in opposite directions on the two bellows members 40 and 42. Even if a change in temperature causes the volume of the fluid to expand, thus increasing the internal pressures in the two tank chambers, the increased pressures will offset each other through the opening 38 in the partition because the effective areas of the two bellows members 40 and 42 are equal.

For these reasons, the damper introduces no significant error into the weighing system as a result of changes in temperature.

Figure 10:
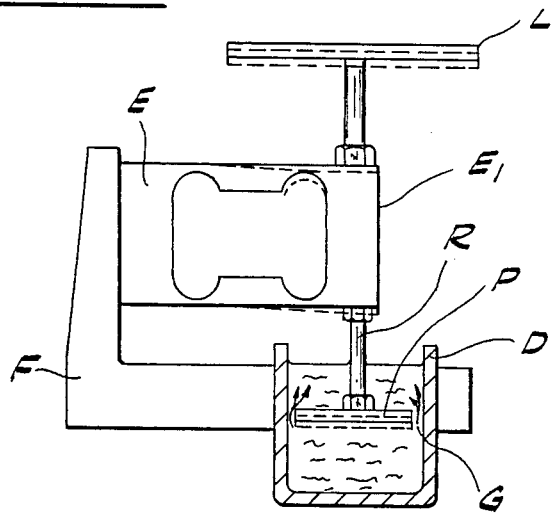
FIG. 10 is a side view partially in cross section of a conventional weighing apparatus of the load cell type.

Unlike the conventional damper shown in FIG. 10, there is no need for the peripheral gap between the casing wall 22 and the tank wall 32 to be uniform. This is because the bellows members 40, 42 serve as the walls of the tank 43.

FIG. 3 shows an alternative form of tank 143, wherein the peripheral walls are formed by diaphragms 140 and 142, in place of the bellows members 40 and 42 in FIG. 2.

FIG. 4 shows a damper, which includes a vertical cylindrical frame 222 fixed to the base frame (not shown). Fixed to the top end of cylindrical frame 222 is a horizontal partition 236, which is formed with a center opening 238 through it. A rod 228 connects the free end of the elastic load cell member (not shown) with a vertical shaft 232, which extends through the opening 238 with an annular gap formed between the shaft and the partition 236. Fixed to both ends of shaft 232 are upper and lower horizontal discs 224 and 226, respectively, (constituting spaced support means). A pair of cylindrical bellows members 240 and 242 extend vertically between the disc 224 and partition 236 and between the disc 226 and partition 236, respectively. Thus, two chambers of tank 243 are formed within the bellows members. This arrangement gives the same results as the arrangements of FIGS. 2 and 3.

FIG. 5 shows a damper, which includes a vertical frame member 322 fixed to the base frame (not shown). A pair of horizontal walls 324, 326 (constituting spaced support means) extend respectively from the upper and lower ends of the vertical frame member. A rod 328 connects the free end of the elastic load cell member (not shown) with an L-shaped member 330. A horizontal partition 336 extends from the lower end of member 330. The partition 336 is formed with a vertical center opening or hole 338 through it. The partition 336 is formed with a horizontal bore 50 which opens at one end in an outer edge of partition 336, and which terminates at its other end in a conical portion opening into the hole 338. The peripheral wall of hole 338 is formed with a conical recess 52 as the apex portion of the conical portion of bore 50.

A throttle valve 54 has a conical head movable in the conical portion of bore 50 and the conical recess 52. By screwing the throttle valve 54 into or out of the bore 50, the cross-sectional area of hole 338 can be varied to adjust the damping effect. In this case, by using a low-viscosity fluid with good flowability and throttling the hole 338 to a very small cross-sectional area, it is possible to obtain optimum damping characteristics across a wide range. Furthermore, the throttle valve 54 can be adjusted externally by a screwdriver.

FIG. 6 shows a damper having a basic construction similar to that of FIG. 4. The cylindrical shaft 432, which extends through the opening 438 of partition 436 to form an annular gap between the shaft and partition, is formed with an axial bore 450. The bore includes an upper conical portion and a cylindrical portion, which opens at the lower end of shaft 432. The shaft 432 is formed with radial holes 56 and 58 located above and below the partition 436, respectively. The upper hole 56 communicates with the upper end of the conical portion of bore 450, while the lower hole 58 communicates with the cylindrical bore portion.

A throttle valve 454 has an upper cylindrical portion 60, which is thin enough to form an annular space in the cylindrical portion of bore 450 interconnecting the conical bore portion and the lower hole 58. The upper throttle valve portion 60 has a conical head for engagement with the conical bore portion. The throttle valve 454 is screwed into the bore 450 so as to vary the cross-sectional area through which the fluid flows, similar to the throttle design in FIG. 5.

Figure 7:
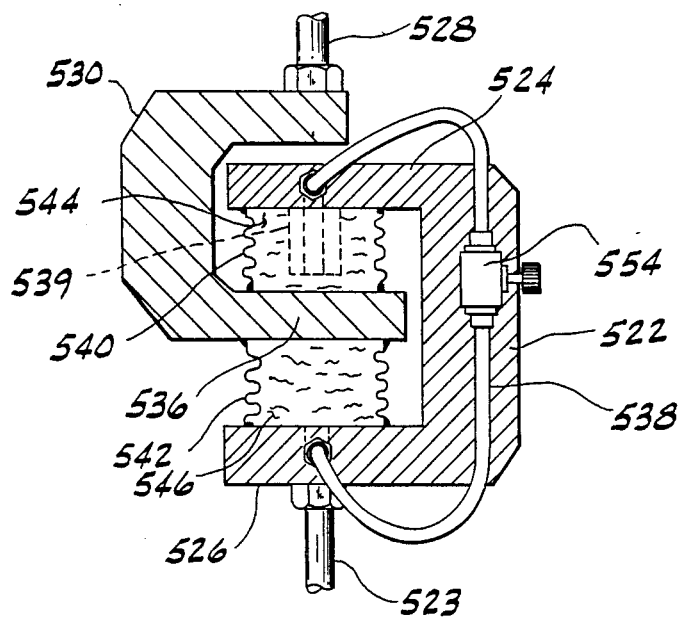

FIG. 7 shows a damper, which includes a vertical frame member 522, and a pair of horizontal frame members 524, 526 (constituting spaced support means) extending from respective upper and lower ends of the vertical frame member. The lower frame member 526 is fixed to the base frame (not shown) by a rod 523. An upper rod 528 connects the free end of the elastic load cell member (not shown) with an L-shaped member 530. A horizontal partition 536 extends from the lower end of member 530. Bellows members 540 and 542 extend between the upper frame member 524 and partition 536 and between the lower frame member 526 and the partition, thus forming separate upper and lower tanks 544, 546 over and under the partition.

A conduit comprising a pipeline 538 extends between the upper and lower frame members 524, 526 outside the bellows 540 and 542. One end of pipeline 538 communicates with the upper tank through passaging in the upper frame member 524 and a short pipe 539 which extends down from the upper frame member 524 into the upper tank. The other end of pipeline 538 communicates with the lower tank 546 through passaging in the lower frame member 526. The pipeline 538 is provided with a throttle 554 for controlling the flow of fluid between the two tanks 544, 546. The short pipe 539 prevents any small amount of gas in the upper tank 544 from entering the pipeline 538.

Figure 8:
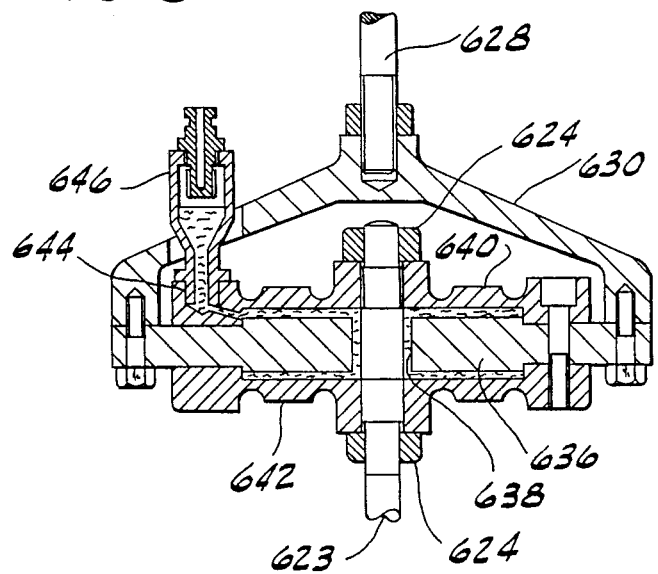

FIG. 8 shows a damper for use with an elastic load cell member (not shown) having an extremely small amplitude of vibration or flexure. This damper includes a rod 628 interconnecting the free end of the elastic load cell member and a conical member or skirt 630. This skirt supports a horizontal circular partition 636 bolted to its lower end. The partition 636 is formed with a center hole 638 through it. Another rod 623 is fixed to the base frame (not shown) and extends up through the hole 638 in the partition 636, thereby forming an annular gap around the rod. Fixed coaxially to the rod 623 between a pair of support members 624 (constituting spaced support means) on the rod are a pair of spaced circular diaphragms 640 and 642 (constituting flexible wall means), which may be made of aluminum, for example. The diaphragms 640 and 642 extend on respective upper and lower sides of partition 636, and are bolted at their peripheries to the partition so as to form two enclosed chambers, one between the upper diaphragm and the partition and the other between the lower diaphragm and the partition. The upper diaphragm 640 has a hole 644 formed through it communicating with the upper chamber. Screwed into the hole 644 is a plug 646 for supplying oil to the chamber and also for functioning as an air reservoir.

These diaphragms 640, 642 are simple and easy to assemble, and this construction is suitable for use with pressurized fluid, especially sealed under high pressure. If the fluid is used in a pressurized state, it is possible to obtain a greater damping effect than with non-pressurized fluid. This allows the damper of the present invention to be more compact, reducing the amount of inertial force. This type of damper is especially ideal for weighing apparatuses, etc. using an elastic load cell member subjected to little flexure by the load.

Figure 9:
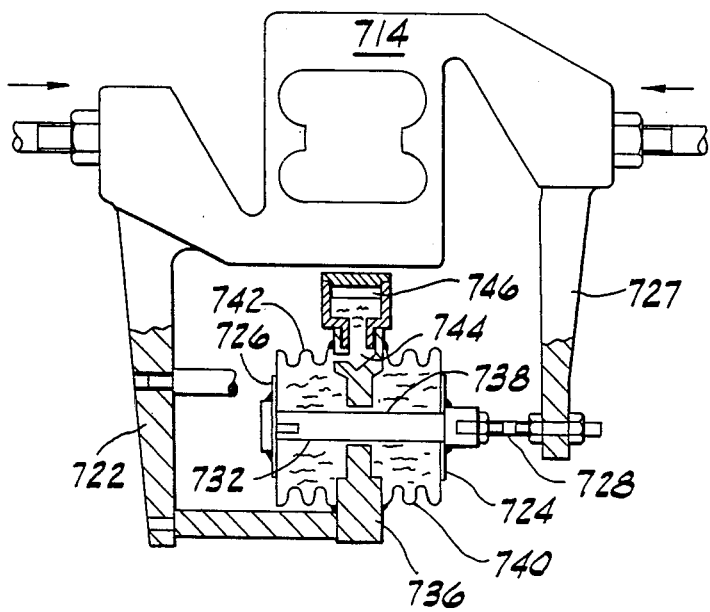

FIG. 9 shows a damper for use with an apparatus used to measure horizontal forces, such as that used in a multiple force component tester. This apparatus includes an elastic load cell 714 having upper and lower ends, one of which is fixed to the base frame (not shown), and the free end of which is connected with a part to which a load is applied. The lower end of load cell 714 is connected via an L-shaped member 722 with a vertical partition 736, which is formed with a center opening 738 through it. The upper end of the load cell 714 is connected through a vertical member 727 and a horizontal rod 728 with a horizontal shaft 732, which extends through the opening 738 to form an annular gap between the shaft 732 and the partition 736. Fixed to both ends of shaft 732 are vertical discs 724 and 726, respectively, (constituting spaced support means). A pair of cylindrical bellows members 740 and 742 extend horizontally between the disc 724 and partition 736 and between the disc 726 and partition 736, respectively. The upper portion of partition 736 is formed with a port 744 interconnecting the ambient environment and the space or chamber inside the bellows member 742. Screwed into the port 744 is a plug 746 similar to the plug 646 in FIG. 8.

According to this invention, there are no adverse effects on buoyancy which result from changes in surface area in contact with the fluid caused by the surface tension of the fluid, thus making the damper well-suited for use with weighing apparatuses which require a high level of precision in high-speed measurements.

Because the weighing apparatus can be moved with fluid inside the tank, the apparatus can be inspected at the factory with fluid inside the tank and shipped in that condition. Thus, draining of the fluid at the factory, refilling the tank with fluid at the work site, and then re-inspecting the damping characteristics of the damper all become unnecessary.

Unlike conventional hydraulic dampers, there is no need during assembly and installation to adjust the gap of the damper, i.e., the peripheral gap between the piston plate and the inner wall of the casing, so that it is uniform, and thus assembly and installation of the weighing apparatus are extremely easy. In addition, although conventional hydraulic dampers require periodic inspection and adjustment of that gap, this is unnecessary with the hydraulic damper of this invention.

Furthermore, because it is not possible for dust and other foreign matter to get into the fluid inside the tank, the fluid can be maintained in a state of high quality for a long period of time, and the desired stable damping characteristics can be consistently obtained and maintained.

Because the damper can be used in a horizontal configuration, which is impossible with conventional hydraulic dampers, it can easily be used to provide excellent damping characteristics, etc., for a measuring apparatus such as a multiple force component tester.

Thus, a hydraulic damper of this invention has excellent damping characteristics, etc., and can be easily assembled and installed. Maintenance can also be performed extremely easily.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hydraulic damper for an apparatus for measuring weight or force, said apparatus including a base frame and elastic means attached to the base frame, said elastic means having a movable part adapted to vibrate relative to said base frame, said damper comprising:

a pair of spaced support means fixed to each other and to one of said base frame and said movable part, partition means fixed to the other of said base frame and said movable part and positioned between said pair of support means, a pair of flexible wall means extending between said partition means and said pair of support means to form a pair of sealed chambers on opposite sides of said partition means, narrow passage means interconnecting said chambers, and liquid contained in said chambers whereby movement of said movable part is adapted to effect relative movement between said partition means and said support means to force liquid to flow between the chambers via said narrow passage means thereby to damp said movement of said movable part.

2. The damper of claim 1, wherein each of said chambers is formed between one of said support means and said partition means and surrounded by one of said flexible wall means.

3. The damper of claim 1 or 2, wherein said passage means comprises an opening formed through said partition means.

4. The damper of claim 1 or 2 wherein said passage means comprises a conduit extending outside said chambers between said support means.

5. The damper of claim 4 wherein said passage means further comprises passaging in each support means interconnecting said conduit and a respective chamber.

6. The damper of claim 1 or 2, further comprising throttle means in said passage means for restricting the flow of liquid through said passage means.

7. The damper of claim 1, wherein said pair of flexible wall means comprises two parallel diaphragms on opposite sides of said partition means, said diaphragms being fixed adjacent their centers to respective support means and adjacent their peripheries to said partition means.

8. The damper of claim 1 or 2, wherein said partition means is disposed generally vertically.

9. The damper of claim 1 or 2, wherein said partition means is disposed generally horizontally.

10. The damper of claim 1 or 2, wherein each said flexible wall means comprises a bellows member.

* * * * *